United States Patent
Hacman et al.

4,057,316
Nov. 8, 1977

[54] REFLECTION REDUCING MULTILAYER SYSTEM ON A HIGHLY REFRACTIVE INFRARED TRANSMITTING SUBSTRATE

[75] Inventors: Dionys Hacman, Trubbach, Switzerland; Adolf Keutschegger, Triesenberg, Liechtenstein

[73] Assignee: Balzers Patent- und Beteiligungs-Aktiengesellschaft, Liechtenstein

[21] Appl. No.: 658,454

[22] Filed: Feb. 17, 1976

[30] Foreign Application Priority Data

Feb. 18, 1975 Switzerland .................... 002014/75

[51] Int. Cl.² ............................................... G02B 5/28
[52] U.S. Cl. ........................................ 350/1; 350/166
[58] Field of Search ............... 350/1, 276 R, 164–166

[56] References Cited

U.S. PATENT DOCUMENTS

| 3,020,406 | 2/1962 | Whitney ..................... 350/1 X |
| 3,033,701 | 5/1962 | Wozniak .................... 350/1 UX |
| 3,614,188 | 10/1971 | Seeley et al. ................ 350/1 |
| 3,849,738 | 11/1974 | Hakki ..................... 350/164 X |

FOREIGN PATENT DOCUMENTS

| 783,626 | 9/1957 | United Kingdom .................... 350/1 |

OTHER PUBLICATIONS

Feilchenfeld, "Zinc Selenide as a Highly Refractive Substance in Dielectric Refl. Layers for . . . Interference Filters", *Chem. Abstracts*, vol. 64, p. 4439, 1966.
Rudisill et al., "Optical Coatings for High Energy ZnSe Laser Windows", *Applied Optics*, vol. 13, No. 9, pp. 2075–2080, Sept. 1974.

*Primary Examiner*—John K. Corbin
*Assistant Examiner*—John D. Lee
*Attorney, Agent, or Firm*—McGlew and Tuttle

[57] ABSTRACT

A reflection reducing system on a highly refractive infrared transmitting substrate, comprises a germanium layer immediately adjacent the substrate, an adjoining layer of zinc selenide, and at least one layer of $Al_2O_3$ terminating the layer system to the outside.

10 Claims, 3 Drawing Figures

REFLECTION REDUCING MULTILAYER SYSTEM ON A HIGHLY REFRACTIVE INFRARED TRANSMITTING SUBSTRATE

FIELD AND BACKGROUND OF THE INVENTION

This invention relates in general to the construction of reflection reducing layers and, in particular, to a new and useful reflection reducing multilayer system for highly refractive, infrared transmitting substrates, primarily germanium and silicone, which are largely used in infrared optics.

DESCRIPTION OF THE PRIOR ART

Various reflection reducing stratified systems for highly refractive substrates are already known. Experience has shown, however, that in practice, they often adhere poorly to the substrate, particularly one of germanium or silicone, and they are also subject to considerable mechanical stresses. Such stresses are due to the great thickness of the layers, which are necessary in the infrared field. The unequal thermal expansion of the individual layers at temperature variations may also lead to internal stresses in the multilayer coating so that the coating tends to crack or peel off. Such stratified systems can be used only within a very limited temperature range.

Another problem with reflection reducing multilayer systems for infrared is that, according to experience, for a radiation in the range between 2.5 and 4 μm, they show absorption bands even if the layers have been built up of substances which, in themselves, are free from absorption in this range. In general, it is assumed that such a disturbing absorption is due to absorbed water. Depending on the nature of the substrate and the applied layers, the exact position of the absorption bands may vary.

As described in JOSA, Vol. 51, No. 7, July 1961, p. 718, tests have shown that although the undesirable absorption can be temporarily eliminated by heating the substrate and the applied layers, the absorption reappears after a short period of dwell of the stratified system in the air. Thus, with the use of the system in air of normal humidity, the disturbing absorption bands were apparently unavoidable. As described in "Applied Optics", Vol. 13, No. 6, June 1974, p. 1275, an attempt was made to build up a layer system of substances which are as little hygroscopic as possible and, specifically, a four layer system has been provided with the sequence of layers: silicon, thallous bromide, lead fluoride and strontium fluoride. The top layer of strontium fluoride was intended as a protection of the underlying, slightly hygroscopic, lead fluoride. With this system, however, the $H_2O$ absorption bands could not be eliminated either. The published transmission curve shows approximately 95% of transmission in the near vicinity of 3 μm, but drops to 70% at that point.

As also described in JOSA, Vol. 51, No. 7, July 1961, p. 718, similar effects have been observed with anti-reflex coatings of cerium oxide and magnesium fluoride on silicon substrates and with anti-reflex coatings of zinc sulfide and silicon monoxide or silicon, cerium oxide and magnesium fluoride on germanium substrates. On potassium bromide substrates, an absorption band has again been obtained at 3 μm with quartz films, which have been imputed to absorbed water, as well as with layers of rare-earth oxides. (See: "Applied Optics", Vol. 10, No. 12, Dec. 1971, p. 2686; "Vakuum-Technik", Year 22, No. 2, p. 53; and JOSA, Vol. 48, No. 10, p. 678.)

SUMMARY OF THE INVENTION

The present invention is directed to a reflection reducing multilayer system showing no disturbing $H_2O$ absorption bands between 2.5 and 4 μm, adhering well to the substrate, and subject to only small mechanical stresses.

In accordance with the invention, there is provided a stratified system comprising a germanium layer immediately ajacent the substrate, an adjoining layer of zinc selenide, and at least one layer of $Al_2O_3$ terminating the layer system to the outside.

For an understanding of the principles of the invention, reference is made to the following description of typical embodiments thereof as illustrated in the accompanying drawing.

DESCRIPTION OF THE PREFERRED EMBODIMENTS

Referring to substrate 1 of FIG. 1, reflection reduction coatings have been applied to germanium and silicon substrates in layers 2 to 5 as shown for four examples A, B, C and D, in the table to follow hereinafter. In the table, the first line indicates the substrate used, the next lines show the order of succession of the layer substances of the system (the first layer being that adjacent the substrate and the last layer bordering on the air) with the respective (geometrical) thickness of the layer in nm. The last line indicates at what wavelength (in um), a minimum of reflection has been obtained with the respective system.

TABLE

|  | A | B | C | D |
|---|---|---|---|---|
| Substrate | Ge | Si | Ge | Si |
| Layer 1. | Ge/1.5 | Ge/1.5 | Ge/1.5 | Ge/1.5 |
| Layer 2. | ZnSe/184 | ZnSe/233 | ZnSe/135 | ZnSe/207 |
| Layer 3. | $Al_2O_3$/278 | $Al_2O_3$/352 | Si/119 | Ge/45 |
| Layer 4. | — | — | $Al_2O_3$/629 | $Al_2O_3$/639 |
| $R_{min}$-range in μm | 2.5–3.2 | 3.0–3.6 | 2.8–5.2 | 2.8–5.2 |

The individual layers have been applied to the previously cleaned substrates in a manner known per se, by evaporation or cathode sputtering of the mentioned substances. The layer thicknesses have been measured by means of a conventional oscillator-crystal layer thickness meter.

Figure 1:
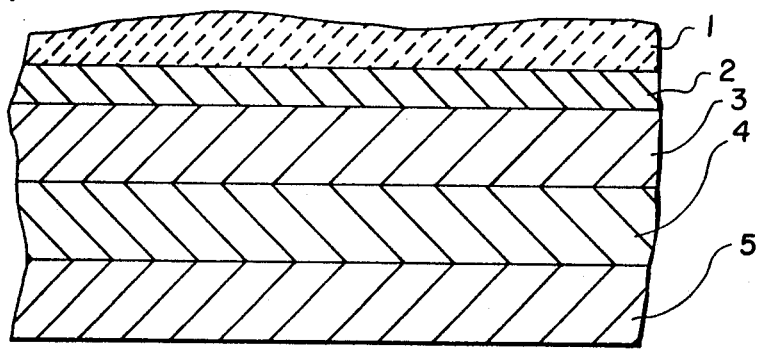
FIG. 1 is a sectional view of a substrate having a reflection reducing multilayer system constructed in accordance with the invention.
Figure 2:
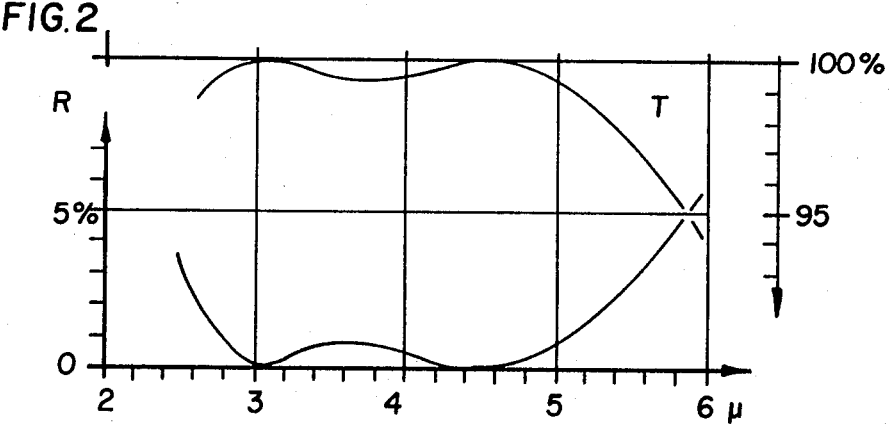
FIG. 2 is a curve of reflection and transmission characteristics for the system of the invention in accordance with one example.
Figure 3:
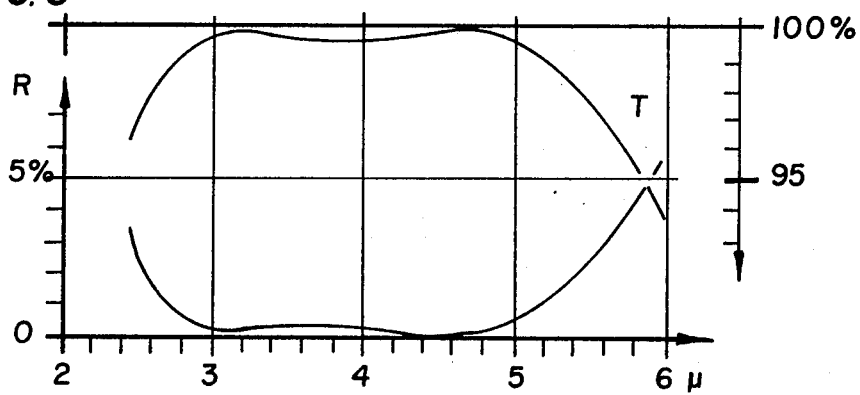
FIG. 3 is a curve similar to FIG. 2 of another example.

FIG. 1 shows a diagrammatical illustration of the buildup of a layer system corresponding to the two last-mentioned examples C and D. The substrate 1 is followed by an adhesion layer 2 of germanium, a layer 3 of zinc selenide, another layer 4 of germanium or silicon, and a top layer 5 of $Al_2O_3$. FIGS. 2 and 3 show the reflection curves R obtained with this buildup of the layers, with FIG. 2 relating to example C, and FIG. 3 relating to example D. Both examples make it clear that, in the wavelength range of approximately 2.8 to 5.2 μm, the reflection is reduced to a very small value and rises to higher values only outside of that range. The transmission curves T, which are also plotted in FIGS. 2 and 3, further show that within the previously mentioned range, practically no absorption is present (R + T = 100%).

With the substances shown in FIG. 1, other reflection reducing layer systems than those which have been described may be built up which show no water absorption bands. The progress obtained by the invention is the more pronounced, the more the number of layers are included in a system since even an only very small absorptive capacity of one of the layer substances, due to water absorption, can lead to inadmissibly high losses in the entire system. For example, four layers situated in the light path and having a 10% absorption each, cause an absorption loss of 34%. With a 2% absorption in each individual layer and four consecutive layers, an absorption of almost 8% is obtained, and, with smaller absorption capacities, the absorption of the entire system corresponds to the sum of absorptions of the individual layers.

The dimensioning of the layer thickness of the individual layers of the system, per se, is not included in the subject matter of the invention. Taking into account the known refractive indices (which may slightly vary depending on the method of deposition) of the layer substances to be used, in accordance with the invention, various reflection reducing systems can be designed. It should be noted that the first germanium layer may be made so thin that its optical effect is substantially of no consequence. The advisable thickness is approximately between 1 and 5 nm. The first germanium layer assumes the function of an adhesive layer, i.e., it ensures a firm connection between the infrared-transmitting substrate and the ZnSe layer of the inventive stratified system. It appears that only a pure germanium layer complies with the requirements of a satisfactory bond and, at the same time, has usefulness in the critical wavelength range from 2.5 to 4 μm. Surprisingly, the first germanium layer is indispensable also in cases where the substrate itself is of germanium. It is further important for the result in accordance with the invention that, aside from the layers of the recommended layer substances, no other layers are built into the system.

While specific embodiments of the invention have been shown and described in detail to illustrate the application of the principles of the invention, it will be understood that the invention may be embodied otherwise without departing from such principles.

What is claimed is:

1. A reflection reducing multilayer system on a germanium substrate, said system comprising four individual layers arranged in sequence as follows: Ge, ZnSe, Si and $Al_2O_3$.

2. A reflection reducing multilayer system according to claim 7, wherein said germanium layer is 1.5 nm.

3. A reflection reducing system according to claim 7, wherein the thickness of ZnSe is 135 nm.

4. A reflection reducing multilayer system according to claim 1, wherein the thickness of the Si layer is 119 nm.

5. A reflection reducing multilayer system according to claim 1, wherein the $Al_2O_3$ layer has a thickness of 629 nm.

6. A reflection reducing multilayer system on a silicon substrate, said system comprising four successive individual layers in the following sequence: Ge, ZnSe, Ge, and $Al_2O_3$.

7. A reflection reducing multilayer system according to claim 6, wherein the Ge layers are 1.5 nm in thickness.

8. A reflection reducing multilayer system according to claim 6, wherein the ZnSe layer has a thickness of 207 nm.

9. A reflection reducing multilayer system according to claim 6, wherein the Ge layer arranged adjacent the substrate has a thickness of 1.5 nm and the Ge layer between the ZnSe and the $Al_2O_3$ is 45 nm.

10. A reflection reducing layer according to claim 6, wherein the $Al_2O_3$ layer has a thickness of 639 nm.

* * * * *